US009144052B2

(12) United States Patent
Twell (10) Patent No.: US 9,144,052 B2
(45) Date of Patent: Sep. 22, 2015

(54) METHOD OF DETERMINING LOCATION (75) Inventor: Timothy Twell, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 163 days.

(21) Appl. No.: 13/876,984

(22) PCT Filed: Sep. 27, 2011

(86) PCT No.: PCT/GB2011/001400
§ 371 (c)(1),
(2), (4) Date: Mar. 29, 2013

(87) PCT Pub. No.: WO2012/042201
PCT Pub. Date: Apr. 5, 2012

(65) Prior Publication Data
US 2013/0182603 A1   Jul. 18, 2013

(30) Foreign Application Priority Data
Sep. 29, 2010  (EP) .................................. 10251676

(51) Int. Cl.
H04W 64/00    (2009.01)
H04W 4/02     (2009.01)
H04L 29/08    (2006.01)
(52) U.S. Cl.
CPC ................ H04W 64/00 (2013.01); H04W 4/02 (2013.01); H04L 67/306 (2013.01)

(58) Field of Classification Search
CPC ...... H04W 4/02–4/022; H04W 64/00–64/006; H04L 63/10–63/104; H04L 63/108; H04L 67/30–67/306
USPC ............... 370/252–338, 352; 455/414.1, 410; 709/204
See application file for complete search history.

(56) References Cited

U.S. PATENT DOCUMENTS

| 6,745,193 | B1* | 6/2004 | Horvitz et al. ................ 707/796 |
| 2002/0173295 | A1* | 11/2002 | Nykanen et al. ............. 455/414 |
| 2003/0008668 | A1* | 1/2003 | Perez-Breva et al. ......... 455/456 |
| 2007/0176741 | A1* | 8/2007 | Montenegro ................. 340/5.83 |
| 2010/0203901 | A1* | 8/2010 | Dinoff et al. ............... 455/456.3 |
| 2014/0108540 | A1* | 4/2014 | Crawford ..................... 709/204 |

OTHER PUBLICATIONS

International Search Report (6 pgs.) dated Apr. 18, 2012 issued in corresponding International Search Report PCT/GB2011/001400.

* cited by examiner

Primary Examiner — Afsar M Qureshi
(74) Attorney, Agent, or Firm — Nixon & Vanderhye PC (57) ABSTRACT A method for determining a location of a mobile apparatus based on the presence of wireless access point signals. The received wireless signal strength from a plurality of observed wireless access points is compared with profiles each relevant to a different user context and containing a plurality of previously registered wireless access point signal strengths around a previously registered location. The location of the mobile apparatus is determined based on the profile most closely matching the collection of observed wireless access points. Wireless access points present in the profile but not observed are ignoring during the matching process.

9 Claims, 5 Drawing Sheets

METHOD OF DETERMINING LOCATION

This application is the U.S. national phase of International Application No. PCT/GB2011/001400, filed 27 Sep. 2011, which designated the U.S. and claims priority to EP Application No. 10251676.2, filed 29 Sep. 2010, the entire contents of each of which are hereby incorporated by reference.

The present invention relates to location services and in particular to a method of determining a user's location based on any surrounding Wi-Fi networks.

In recent times mobile devices such as smart phones, personal digital assistants (PDAs) and small computers, have started to include hardware and software to determine their geographic location by triangulating their position relative to a number of reference points. These reference points include terrestrial structures such as buildings or cellular masts, as well as geostationary satellites such as the Global Positioning Service (GPS).

Once the location, in the form of longitude and latitude coordinates, of the device has been determined, the location information is passed to higher level applications or services running on the mobile device. These applications include mapping software to display the mobile device's position as well as "location based services" which cause a change in the operation of the mobile device or delivery of personalised information. The location information can also be pushed to a "presence" server which informs others of the mobile device's position.

Fingerprinting is another known location determining technique. In fingerprinting, the mobile device can determine its location based on its proximity to surrounding Wi-Fi networks. Rather than rely on timing information to triangulate a position, the fingerprinting method relies on sampling the signal strength of surrounding WiFi networks and matching the observed samples with a stored profile or fingerprint. Each wireless network is identified by the SSID name and more importantly the unique Media Access Control (MAC) address of the wireless access point which generates the WiFi network. Provided the location of each wireless access point, fingerprinting can be highly accurate. However, relying on an observed signal strength can be disadvantageous because WiFi signal strength is not consistent over time. For example, the wireless access point may have been moved to a different part of the location, the addition of a new wireless access point can cause interference which reduces signal strength or conversely, the removal of a wireless access point may result in stronger signal strength.

With current methods of location determination based on WiFi, a match with a previously registered location can only be achieved if the observed signal strength corresponds to the previously registered "fingerprint". Any significant deviations in the measurements lead to inaccurate location detection.

The present invention addresses some of the above issues to provide a robust determination of location in specific circumstances.

In particular, apart from mapping applications, often determining the exact location is an unnecessary use of processing power which is always at a premium with mobile devices having limited power. Furthermore, privacy issues mean that users of such devices do not want applications, in particular internet based applications to know their exact location. A much coarser indication of location is often sufficient, for example uploading information to a presence server that the user is at the office, or at home. As such these represent a user context. Such applications are already known but must first determine a precise location, followed by extra processing to obscure the location.

STATEMENTS OF INVENTION

In one aspect, the present invention provides a method of determining a location as set out in claim 1.

In a further aspect, the present invention provides a mobile device for determining a location as set out in claim 5.

In another aspect, the present invention provides a method of generating a fingerprint profile as set out in claim 9.

In a further aspect, the present invention provides an apparatus for generating a fingerprint profile as set out in claim 10.

In a yet further aspect, the present invention provides a computer program product as set out in claims 11 and 12.

LIST OF FIGURES

An embodiment of the present invention will now be described by way of example and with reference to the following figures in which.

DESCRIPTION

Figure 1:
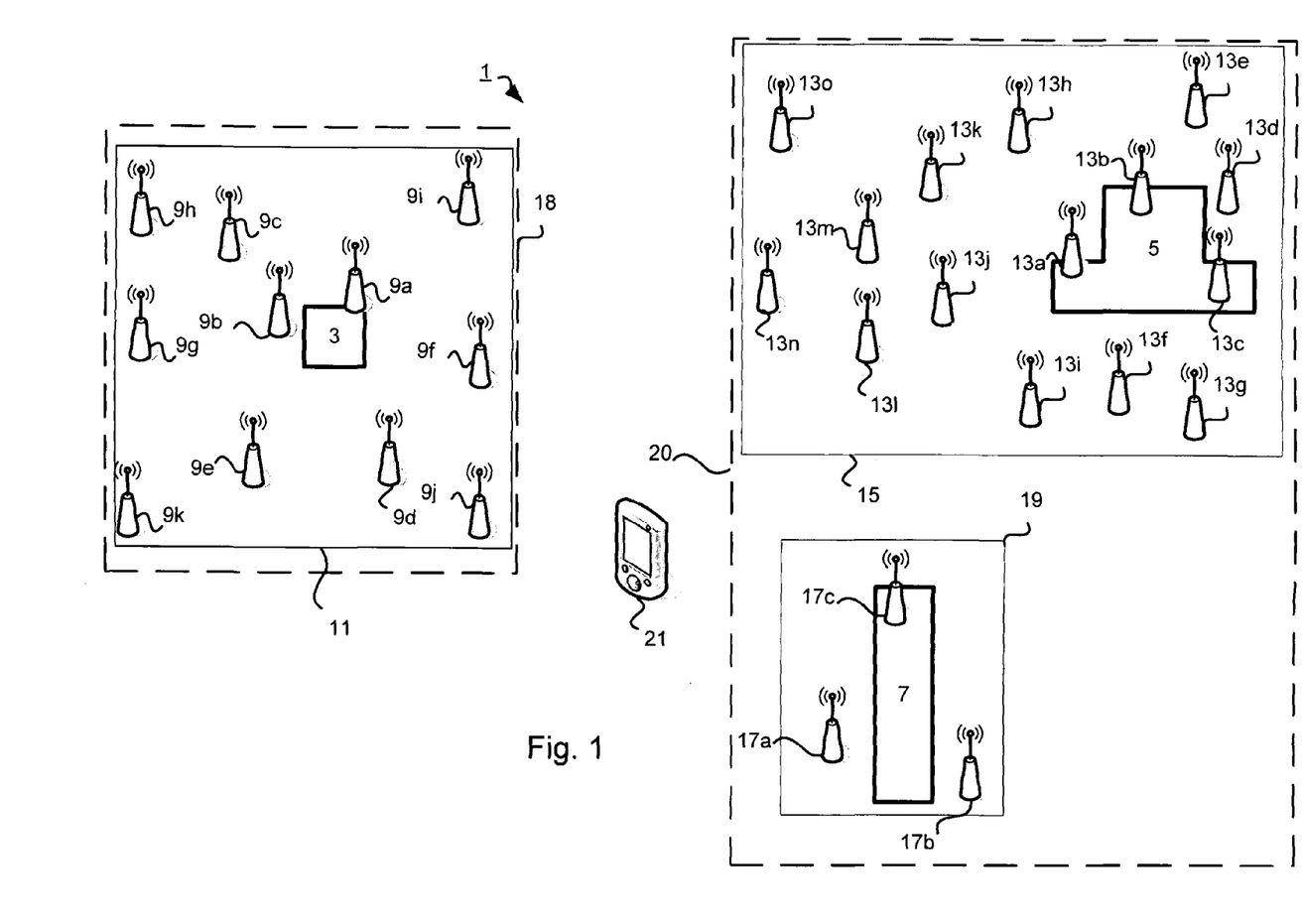
FIG. 1 is a birds-eye view of a geographic area including two office locations and a home location, and the wireless access points and wireless networks surrounding each of those locations.

FIG. 1 shows an overview of a geographic area 1 including user locations which are contextually relevant, wireless access points and the extent of respective WiFi networks.

FIG. 1 shows the user's home 3, a first office location 5 and a second office location 7. Each of the locations is surrounded by a number of wireless access points creating respective WiFi networks operating under the wireless standard 802.11n in this embodiment. In FIG. 1, the user's home is surrounded by eleven wireless access points 9a-9k and for ease of explanation the set of eleven wireless access points 9a-9k is shown within a bounding box 11.

The first office location 5 is surrounded by fifteen wireless access points 13a-13o and for ease of explanation the set of fifteen wireless access points 13a-13k is shown within a bounding box 15.

The second office location 7 has three neighbouring wireless access points 17a, 17b, 17c and ease of explanation, the set of three wireless access points 17a-17c is shown within a bounding box 19.

As will be described later, the set 11 of wireless access points 9 is stored as a profile representing a home context and in FIG. 1 this is shown as a dashed box 18. The set 15 of wireless access points 13 relating to the first office location 5 and the set of wireless access points 17 relating to the second office location 7 are collectively stored as a profile 20 representing a work context.

Each wireless access point 9, 13, 17 emits wireless signals, and as is conventional, any mobile devices such as a smart-phone 21 having a compatible wireless adaptor can connect to the wireless access points 9, 13, 17 and use any provided services provided the signal strength is sufficiently high enough to maintain a connection. The signal strength detected by the mobile device 21 depends on a number of factors, predominantly the distance from the wireless access point 9, 13, 17 and also any obstructions between the wireless access point 9, 13, 17 and the mobile device 21.

The user can operate the mobile device 21 to connect to a wireless access point 9, 13, 17 and therefore a wireless network for connection to other devices on the wireless network or to the Internet. To do this, the mobile device 21 scans for any available wireless networks 9, 13, 17 and presents the user with a list of networks 11, 15, 19 often ranked by signal strength. The user selects a network, enters a password if necessary and then the mobile device 21 and wireless access point 9, 13, 17 communicate to provide connectivity.

In addition to providing wireless connectivity to other networks for data transfer, in this embodiment, information from the initial scan for surrounding networks is used to determine the mobile device's 21 location in a manner similar in concept to fingerprinting. However, instead of using the signal strength information to triangulate an exact position, the processing only needs to compare whether the mobile device 21 (and hence user) is close to a known and previously registered location.

The mobile device 21 determines when the user is at a particular known location based on a comparison of the signal strengths of observed surrounding wireless access points 9, 13, 17 based upon a stored profile of previously registered wireless access points 9, 13, 17. The profiles are associated with a user's context such as "office" and "home". The mobile device 21 is able to determine a coarse position and associate it with a context without wasting processing on first determining an accurate position followed by a subsequent course determination.

The particular matching process performed by the mobile device 21 when a scan is requested is configured so that only observed wireless access points 9, 13, 17 which are present in a stored fingerprint profile contribute towards the final matching score, while those not present in the fingerprint profile and any newly observed wireless access points are ignored. This is based on the recognition that, particularly in densely population areas, there are many overlapping wireless access points and it is fairly common for new access points to be added and similarly old ones may be removed.

A further advantage of such an arrangement in which non-observed wireless access points 9, 13, 17 do not contribute to the matching score is that the fingerprints themselves can be modified to hold information about more than one location, where they have a common context. For example, in FIG. 1, instead of storing two different "office" profiles, the first office fingerprint can be merged with the second office fingerprint. This combination of profiles allows for smaller storage requirements and less processing power. This processing will be described in more detail later.

The effect of this processing is that matching for known locations is more robust. Not only does it allow for better organisation of the fingerprint, it also tolerates the addition or absence of wireless access points. This accounts for the fact that wireless access points may move or be temporarily unavailable at any given time.

Figure 2:
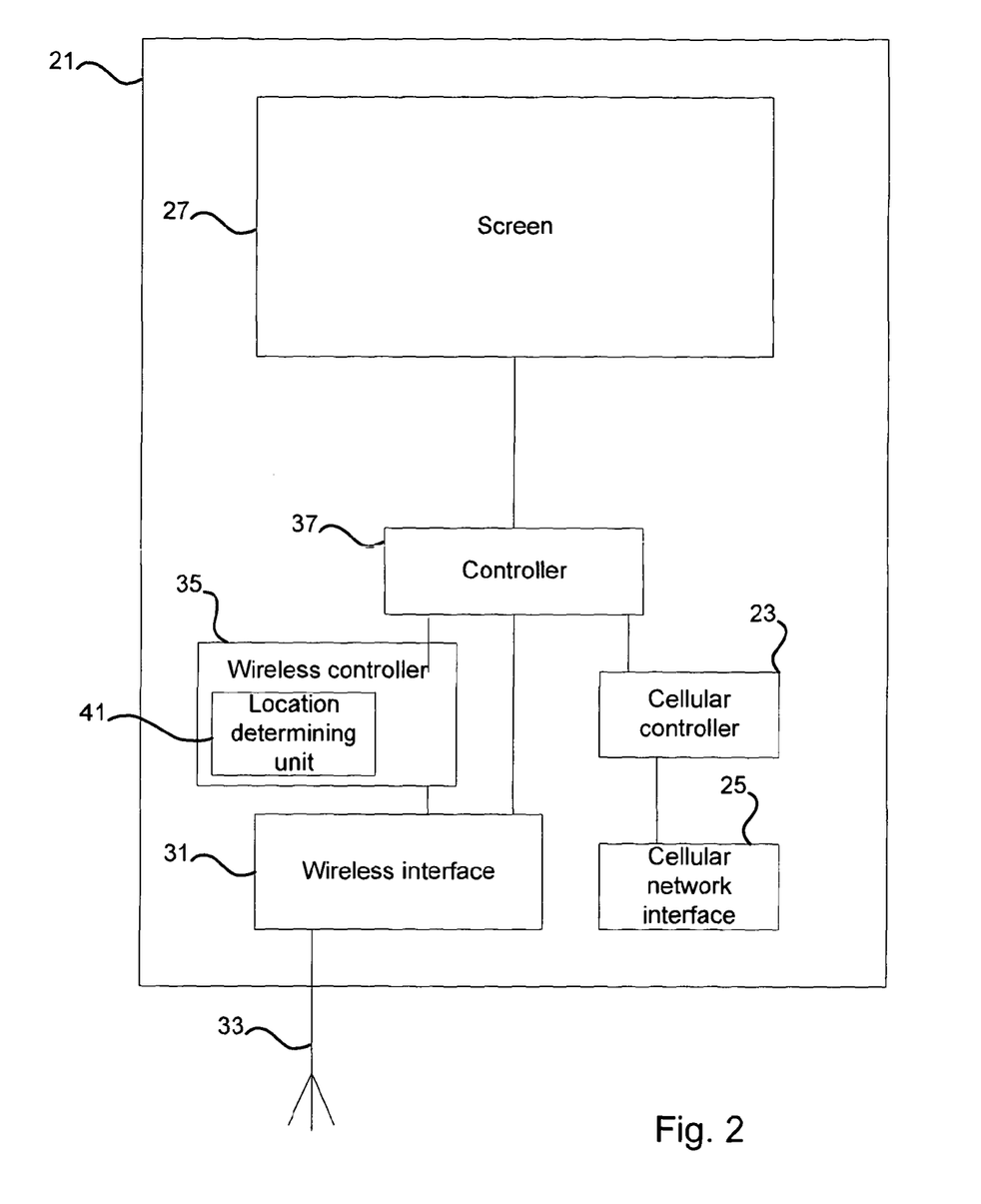
FIG. 2 is a schematic view of the internal components of the mobile device illustrated in FIG. 1.

The components of the mobile device 21 will now be described. FIG. 2 shows the internal functional components on the mobile device 21 in accordance with the first embodiment. In addition to the conventional component for making telephone calls over the cellular network such as a cellular controller 23, a cellular network interface 25 and a screen 27, the mobile device also has a wireless interface 31 for accessing wireless networks via an antenna 33, a wireless controller 35 for managing the higher level operations of the wireless network capability and a controller 37 for managing the overall operation of the phone.

The wireless controller 37 contains program code which enables it to provide location determination functions in accordance with this embodiment and functionally this will be referred to as the location determining unit 41.

Figure 3:
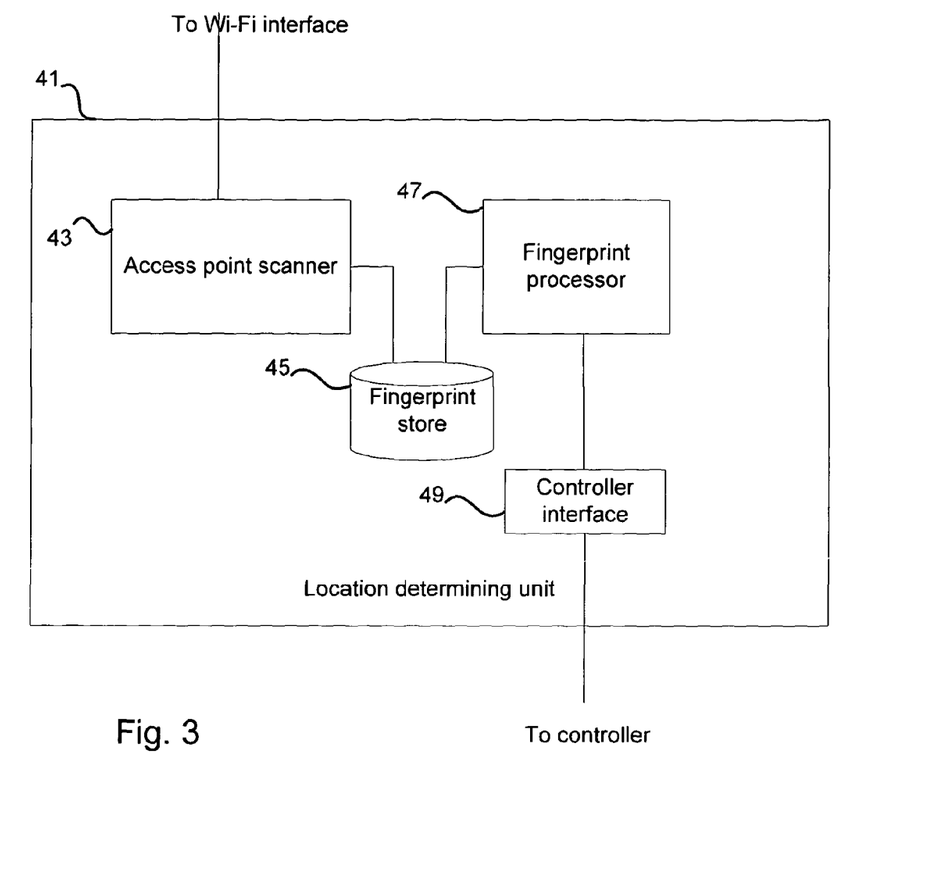
FIG. 3 schematically shows the functional components of a fingerprint processor forming part of the mobile device illustrated in FIG. 2.

FIG. 3 shows the functional components of the location determining unit 41 as provided by the wireless controller 35. In this embodiment the functional components are software programs running on the wireless controller 35 although the functionality could equally be performed by dedicated hardware within the mobile device 21.

The location determination unit 41 include an access point scanner 43. This unit is responsible for determining the presence of surrounding wireless access points 9, 13, 17, and maintaining a record of the MAC address of each observed wireless access point 9, 13, 17, the number of times it has been observed in a scan and the signal strength of the link to each observed wireless access point 9, 13, 17. The observed data is temporarily stored within a part of a fingerprint store 45.

The main functional unit is the fingerprint processor 47 which is responsible for creating fingerprints of places that the user wishes to record for subsequent recognition. The processes for creating, updating and scanning are fairly similar so this unit also controls the components of the location determining unit 41.

Specifically, the fingerprint processor is responsible for accessing the data relating to the observed wireless access points 9, 13, 17 and calculating statistics such as the mean signal strengths for each wireless access point. This is used for the generation of fingerprints and the calculations for matching determinations. The fingerprint store 45 stores the fingerprints generated by fingerprint processor 47.

A controller interface 51 is responsible for receiving user commands relating to the location determining function from the main controller 37 and also passing on any determinations of position by the fingerprint processor 47 to the main controller 37 which results in changes to aspects or operations of the mobile device 21.

Fingerprint Generation

Figure 4:
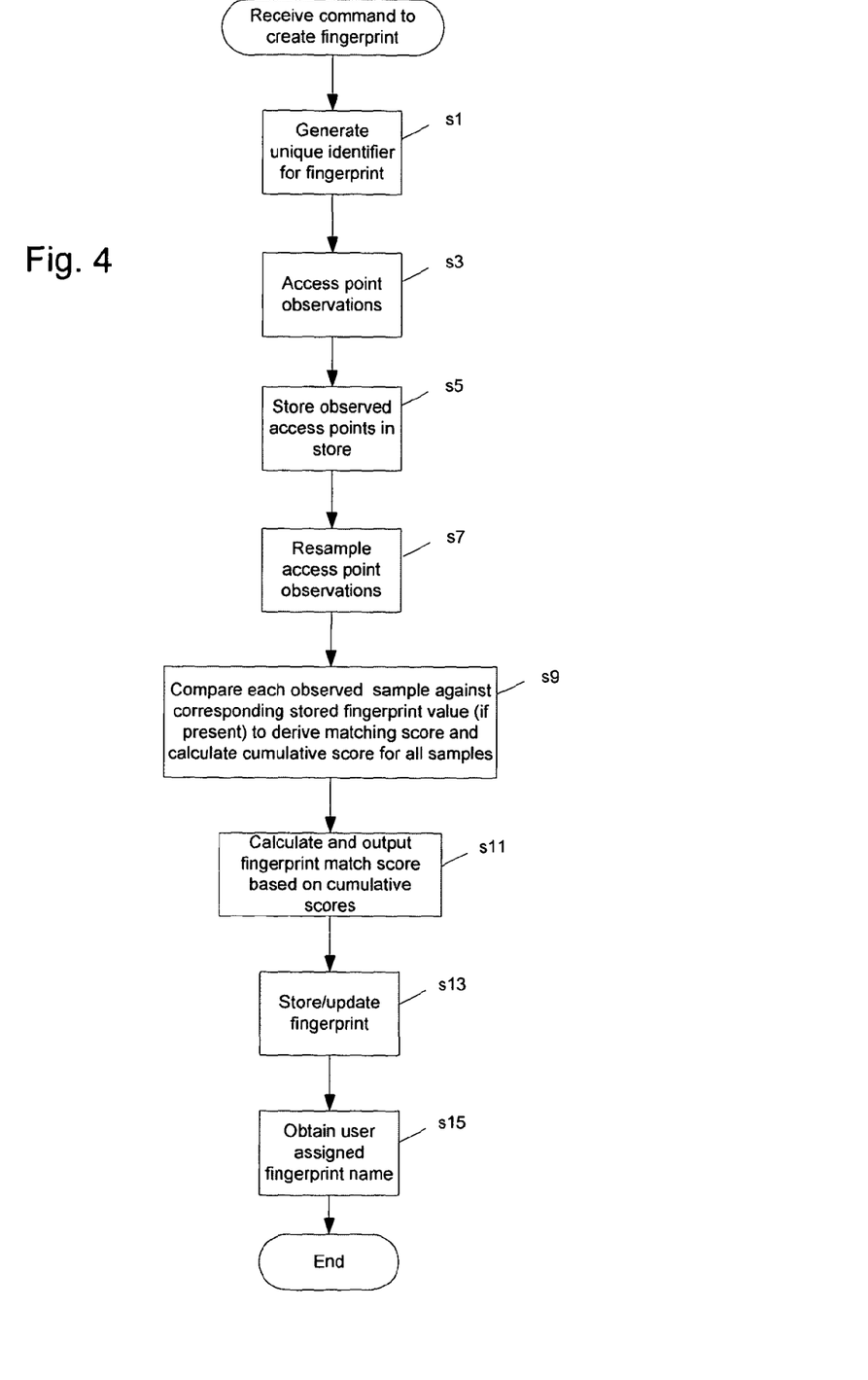
FIG. 4 is a flowchart showing the operation of the mobile device to generate a fingerprint profile at a first location.

The operation of the mobile device for generating a new fingerprint at the office location will now be described with reference to FIG. 4. Once the user has issued a request to create a new fingerprint, in step s1 the fingerprint processor 47 generates a unique internal identifier for the fingerprint, allocates a section of the fingerprint store 45 for storing the new fingerprint and instructs the access point scanner 43.

Having allocated the space, in step s3 the access point scanner 43 performs a scan for surrounding access points and in step s5 the results of the scan are stored in the fingerprint store. In this embodiment, the stored results include: the MAC address of each observed wireless access point, the SSID name of the wireless access point, the partial sum of the observed signal strength measured in −dbm and the number of times each access point has been observed. Clearly at this initial step the partial sum of the signal strength is the actual observed signal strength as there has been only a single observation. The reason for storing a partial sum and number of observations will be described in more detail later. Table 1 shows the results of an exemplary scan at the office location. In this example there are more observed wireless access points than shown in FIG. 1.

TABLE 1

| MAC Address | Name | Partial sum of observed Signal Strength (dBm) | Observations |
|---|---|---|---|
| 00-1A-70-FD-21-11 | L1nksys123 | −52 | 1 |
| 00-11-20-EF-CD-44 | APCC | −56 | 1 |
| 00-18-84-88-CE-37 | FON_FREE_INTERNET | −57 | 1 |
| 00-11-20-EF-CD-42 | PanG0pgtp | −57 | 1 |
| 00-16-E3-1F-A4-8F | RM86ADSL | −59 | 1 |
| 00-11-20-EF-CD-40 | Vocera | −59 | 1 |
| 00-18-84-88-CE-36 | Convergence | −60 | 1 |
| 00-11-20-EF-CD-41 | Healthnet | −62 | 1 |
| 00-11-5C-D1-57-62 | w1Re3.5E2viCe | −76 | 1 |
| 00-11-5C-D1-57-61 | BTOpenzone | −76 | 1 |
| 00-11-5C-D1-57-60 | AR0adrunner | −77 | 1 |
| 00-30-1A-0F-5B-81 | PICTure | −88 | 1 |
| 00-1D-7E-B3-92-AA | BAT-Mesh | −88 | 1 |
| 00-23-33-C3-4E-30 | PICTure | −95 | 1 |
| 00-23-33-C3-4E-31 | DDI-Testbed | −95 | 1 |

In step s7, having stored the results of the scan, the fingerprint processor 47 instructs the access point scanner 43 to perform another scan and the results of the scan are scored against the stored results.

In step s9 the fingerprint processor 47 compares the scan results with the previously stored fingerprint data in the fingerprint store 45. In particular the fingerprint processor performs checks for wireless access points in the observed set as a result of step s7 which match the wireless access points in the fingerprint. It also performs the following calculations for scoring each wireless access point (represented as pseudocode)

individual scores and includes the number of observed wireless access points. The calculation is set out in the pseudo code below.

```
If (Observed Access Point present in fingerprint) {
    Cumulative = cumulative + score
    Increment (scored access point count)
}
```

Table 2 shows the results of this scan and scoring operation.

TABLE 2

| Wireless Access point | Mean | SigStrength - Mean | Score | Cumulative |
|---|---|---|---|---|
| L1nksys123 | −52 | 0 | 100 | 100 for 1 of 1 |
| APCC | −56 | 0 | 100 | 200 for 2 of 2 |
| FON_FREE_INTERNET | −57 | 0 | 100 | 300 for 3 of 3 |
| PanG0pgtp | −57 | 0 | 100 | 400 for 4 of 4 |
| RM86ADSL | −59 | 0 | 100 | 500 for 5 of 5 |
| Vocera | −59 | 0 | 100 | 600 for 6 of 6 |
| Convergence | −60 | 0 | 100 | 700 for 7 of 7 |
| healthnet | −62 | 0 | 100 | 800 for 8 of 8 |
| w1Re3.5E2viCe | −76 | 0 | 100 | 900 for 9 of 9 |
| BTOpenzone | −76 | 0 | 100 | 1000 for 10 of 10 |
| AR0adrunner | −77 | 0 | 100 | 1100 for 11 of 11 |
| PICTure | −88 | 0 | 100 | 1200 for 12 of 12 |
| BAT-Mesh | −88 | 0 | 100 | 1300 for 13 of 13 |
| PICTure | −95 | 0 | 100 | 1400 for 14 of 14 |
| DDI-Testbed | −95 | 0 | 100 | 1500 for 15 of 15 |

$$\text{Mean strength of stored wireless access point} = \text{partialSumSignalStrength}/\text{observation count} \quad (1)$$

$$\text{Variation} = \text{abs}(\text{ObservedSignalStrength} - \text{mean}) \quad (2)$$

To account for the different actual signal strengths, an approximation/normalisation function is also performed so that all of the measurements are given equal value in subsequent processing. This prevents strong signals being weighted higher than weaker signals.

$$\text{Score} = (\text{mean} - \text{variation})/\text{mean} * 100 \quad (3)$$

In addition to scoring each wireless access point, a cumulative score for the entire set of observed wireless access points is also calculated after each individual wireless access point has been scored. This is simply a running total of the In this checking step after the initial generation of the fingerprint, each wireless router has a 100% match. The overall score for the set of wireless access points is calculated and output in step s11 and is based on the following equation:

$$\text{Match} = \text{Cumulative\_observed\_AP\_score}/\text{observed\_AP\_Count} \quad (4)$$

The algorithm is configured to sum the scores from the access points that are present in the fingerprint, and divide the summed scores by the number of access points actually seen.

As will be described in more detail with reference to more examples later, a further effect of this equation is that newly seen access points would reduce the match score whilst wireless access points which are present in the fingerprint, but not seen, have no effect on the match score.

In step s13 the new fingerprint is stored or updated and in step s15 the stored/updated fingerprint is given a user provided name which is relevant to their context.

In order to improve the accuracy of the fingerprint, the fingerprint processor is arranged to perform multiple scans to capture the signal strength variation of each wireless access point in the fingerprint around the contextual location. The user is instructed to move to a slightly different part of the office. For example, if the initial scan was performed at a northern part of the office, then the next scan would be performed at the southern part of the office.

Steps s3 to s13 are repeated from the new location.

Table 3 shows exemplary results of this further scan and scoring after the first extra scan (steps s3 to s11 repeated).

TABLE 3

| Name | Mean (dBm) | SigStrength - Mean | Score | Cumulative |
|---|---|---|---|---|
| RM86ADSL | −59 | 10 | 84 | 84 for 1 of 1 |
| Convergence | −60 | 6 | 90 | 174 for 2 of 2 |
| FON_FREE_INTERNET | −57 | 3 | 95 | 269 for 3 of 3 |
| . | . | | | |
| . | . | | | |
| PICTure | −88 | −2 | 98 | 1226 for 13 of 13 |
| FMCAProv | | | | 1226 for 13 of 14 |
| FCMATest | | | | 1226 for 13 of 15 |

As described earlier, the match score equation sums the scores from the access points that are present in the fingerprint and divides that score by the number of observed access points. The last two entries are new detected wireless access points which are not part of the fingerprint. Therefore the match score in this case is 1226/15=82 and not 1226/13=94. The matching has been diluted slightly by the presence of new wireless access points.

Having performed this scan and noting a new set of signal strengths, in step s13 the fingerprint processor updates the fingerprint with the updated scan information. In particular, the mean signal strength values are updated as shown in Table 4.

TABLE 4

| Name | Partial sum of observed Signal Strength (dBm) | Number of Observations |
|---|---|---|
| RM86ADSL | −108 | 2 |
| . | | |
| . | | |
| Convergence | −114 | 2 |
| FON_FREE_INTERNET | −111 | 2 |
| PICTure | −178 | 2 |

In this embodiment, steps s3 to s13 are repeated two more times with scans initiated from further points around the office such as the eastern part and the western part.

After a second scan, the scoring against the fingerprint after step s11 is as shown in Table 5.

TABLE 5

| Name | Mean (dBm) | SigStrength - Mean | Score | Cumulative |
|---|---|---|---|---|
| Convergence | −57 | 10 | 83 | 83 for 1 of 1 |
| . | | | | |
| . | | | | |
| FMCATest | −92 | 2 | 98 | 1231 for 13 of 13 |
| DDI-Testbed | −95 | 5 | 95 | 1326 for 14 of 14 |
| PICTure | −89 | −2 | 98 | 1424 for 15 of 15 |

TABLE 5-continued

| Name | Mean (dBm) | SigStrength - Mean | Score | Cumulative |
|---|---|---|---|---|

Followed by another round of updating the fingerprint in step s13 as shown in Table 6.

TABLE 6

| Name | Partial sum of observed Signal Strength (dBm) | Observations |
|---|---|---|
| RM86ADSL | −157 | 3 |
| . | | |
| . | | |
| PICTure | −268 | 3 |
| FMCAProv | −184 | 2 |
| FCMATest | −184 | 2 |

The scoring for the final registration (steps s3 to s11) is shown in Table 7.

TABLE 7

| Name | Mean (dBm) | SigStrength - Mean | Score | Cumulative |
|---|---|---|---|---|
| FON_FREE_INTERNET | −55 | 5 | 91 | 91 for 1 of 1 |
| . | | | | |
| . | | | | |
| DDI-Testbed | −95 | 3 | 97 | 1206 for 13 of 13 |

TABLE 7-continued

| Name | Mean (dBm) | SigStrength - Mean | Score | Cumulative |
|------|------------|--------------------|-------|------------|

The final registered form of the fingerprint after the further scans and updating in step s13 is shown in Table 8.

TABLE 8

| Name | Partial sum of observed Signal Strength (dBm) | Observations |
|------|-----------------------------------------------|--------------|
| RM86ADSL | −206 | 4 |
| Convergence | −222 | 4 |
| FON_FREE_INTERNET | −219 | 4 |
| L1nksys123 | −223 | 4 |
| Healthnet | −242 | 4 |
| PanG0pgtp | −237 | 4 |
| APCC | −236 | 4 |
| Vocera | −239 | 4 |
| w1Re3.5E2viCe | −292 | 4 |
| BTOpenzone | −292 | 4 |
| AR0adrunner | −293 | 4 |
| BAT-Mesh | −352 | 4 |
| DDI-Testbed | −358 | 4 |

After the final update, the stored fingerprint is ready for use in subsequent observations. Performing several scans at different points around the office location improves the accuracy of the fingerprint because it now relates to a two or even three dimensional range of locations rather than a single point.

As mentioned above, the fingerprint does not contain a single mean average figure for signal strength of each wireless access point but instead stores a partial sum of signal strength value and a count of the number of times the wireless access point has been observed. Storing these two pieces of data separately within the fingerprint provides information of the signal strength variation for that wireless access points around the office as well as the permanence of the wireless access point. This arrangement also reduces the computation requirements for updating the mean value when new observations are generated.

Upon registration of the fingerprint, the controller interface 49 informs the controller and 37 and hence the user of successful registration. In this embodiment, the user also sets any actions of the mobile device 21 that are to be associated with the registered location. For example, in the office location, the mobile device can be set to change to a silent profile or divert calls.

Recognition

As described above, the registration processing of FIG. 4 provides a robust fingerprint relating to a particular location such as the office location.

Figure 5:
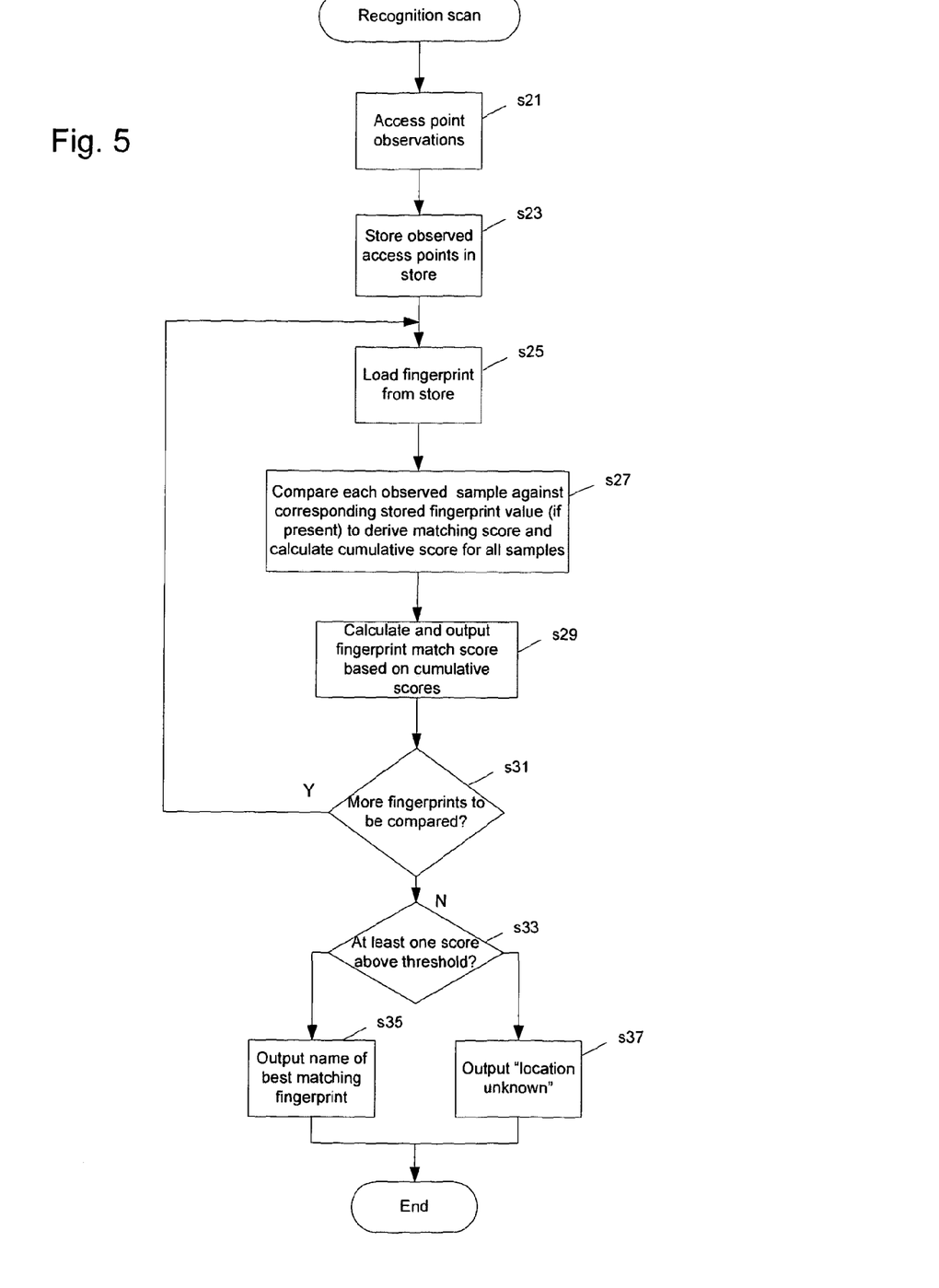
FIG. 5 is a flowchart showing the operation of the mobile device to recognise a location relative to a previously generated fingerprint.

The processing of the fingerprint processor during a later recognition scan will now be described with reference to FIG. 5. As will be seen, the processing is very similar to the actions to store a fingerprint as shown in FIG. 4.

In step s21, the access point scanner 43 scans for surrounding access points and in step s23 the results are temporarily stored in the fingerprint store. This steps correspond to steps s3 and s5 of FIG. 4.

In step s25 one of the stored fingerprints is loaded from the store and steps s27 and s29 correspond in processing to steps s9 and s11 as described earlier to compare the observed access point signal strengths against the store set of access points and corresponding mean signal strengths. Similarly a running cumulative is calculated. The results of steps s27 and s29 are shown in Table 9.

Table 9 shows the results of an exemplary scan when the user is at the office.

TABLE 9

| Name | Mean (dBm) | SigStrength - Mean | Score | Cumulative |
|------|------------|--------------------|-------|------------|
| L1nksys123 | −55 | 4 | 93 | 93 for 1 of 1 |
| Convergence | −55 | 2 | 97 | 190 for 2 of 2 |
| RM86ADSL | −51 | −5 | 91 | 281 for 3 of 3 |
| Vocera | −59 | 3 | 95 | 376 for 4 of 4 |
| Healthnet | −60 | 4 | 94 | 470 for 5 of 5 |
| PanG0pgtp | −59 | 2 | 97 | 567 for 6 of 6 |
| FON_FREE_INTERNET | −54 | −3 | 95 | 662 for 7 of 7 |
| BTOpenzone | −73 | 2 | 98 | 760 for 8 of 8 |
| w1Re3.5E2viCe | −73 | 2 | 98 | 858 for 9 of 9 |
| AR0adrunner | −73 | 2 | 98 | 956 for 10 of 10 |
| APCC | −59 | −24 | 60 | 1016 for 11 of 11 |
| BAT-Mesh | −88 | 2 | 98 | 1114 for 12 of 12 |

Thus the overall match for this profile is 1114/12 = 92.

In this case, only twelve wireless access points were observed. In accordance with the match score equation described above, even though there are thirteen wireless access points stored in the office fingerprint, the matching score is not affected by the absence of the unmatched wireless access point. It is simply ignored from the calculation. Similarly, if there were fifty or a hundred wireless access points in the fingerprint, they would also be ignored if they do not match any of the observed wireless access points.

In step s31 a check is performed to see whether there are any further fingerprints to be compared. If there are then processing returns to step s25 where the next fingerprint is loaded from the fingerprint store 45 and steps s27 to 31 are repeated.

If there are no further fingerprints to be compared, then processing proceeds to step s33 where the overall matching score for each profile is checked against a threshold, in this example 70. If at least one of the scores is above the threshold, then in step s35 the name of the best matching fingerprint is output to the controller. In this example so far there is only one stored fingerprint so the office name is output to the controller.

If there are no scores above the threshold, then in step s37 a "location unknown" message is output to the controller.

In response to a positive determination of location, in this embodiment, the controller alters the mobile device's settings by switching to a silent profile and diverting calls to voicemail, furthermore the controller accesses a remotely located presence server and informs it that the user is at the office and therefore not to be disturbed. Other actions are possible.

New Location

When the user moves to a new unregistered location the mobile device performs a scan of surrounding wireless access points and attempts to match them against any stored fingerprints.

For example, returning to FIG. 1, if the user returns home and a scan is requested by the user, the observed wireless access points around the user's home are compared with the stored Office fingerprint. The results of the scoring operation are set out below in Table 10. There are no matches and therefore the match score is zero.

TABLE 10

| MAC Address | Name | Cumulative score |
| --- | --- | --- |
| 00-23-33-A2-49-91 | DDI-Testbed | 0 for 0 of 1 |
| 00-23-33-A2-49-90 | PICTure | 0 for 0 of 2 |
| 00-23-33-A2-49-94 | FMCAProv | 0 for 0 of 3 |
| 00-23-33-A2-49-92 | FMCATest | 0 for 0 of 4 |
| 00-18-F8-A2-DC-C0 | BAT-Mesh | 0 for 0 of 5 |
| 00-14-95-4A-B2-5A | 2WIRE695 | 0 for 0 of 6 |
| 00-14-95-4B-82-22 | MIG_RED | 0 for 0 of 7 |
| 00-14-69-13-82-E0 | AR0adrunner | 0 for 0 of 8 |
| 00-14-69-13-82-E2 | w1Re3.5E2viCe | 0 for 0 of 9 |
| 00-14-69-13-82-E1 | BTOpenzone | 0 for 0 of 10 |
| 00-11-F5-1D-C5-40 | ex-hall | 0 for 0 of 11 |

Since a scan was requested, the new location may be contextually significant to the user. The fingerprint processor 47 therefore causes the controller 37 to ask the user whether they would like to store a new fingerprint.

If the user replies that they would, then a new fingerprint for the home context is stored. The process is the same as described above for the office fingerprint and the final form of the fingerprint is shown in Table 11 below.

TABLE 11

| Name | Partial sum of observed Signal Strength (dBm) | Observations |
| --- | --- | --- |
| FCMAProv | −225 | 3 |
| FCMATest | −226 | 3 |
| PICTure | −222 | 3 |
| DDI-Testbed | −223 | 3 |
| BAT-Mesh | −237 | 3 |
| 2WIRE695 | −245 | 3 |
| MIG_RED | −259 | 3 |
| Ex-hall | −267 | 3 |
| Extra 1 | −184 | 2 |
| Extra 2 | −186 | 2 |
| ARoadrunner | −276 | 3 |
| Extra 3 | −188 | 2 |

Matching Against 2 Fingerprints

In this example there are now two stored fingerprints. When a user arrives at one of the locations, the mobile device 21 does not know where it is and must therefore perform a scan of the local wireless access points and compares the set of observed access points against each stored fingerprint. The location of the user and mobile device is then determined based on the closest matching fingerprint.

An example using the previously described fingerprints will now be explained.

The scan locates the following wireless access points after steps s21 and s23. The observed set is shown in Table 12.

TABLE 12

| MAC Address | Name |
| --- | --- |
| 00-1A-70-FD-21-11 | L1nksys123 |
| 00-16-E3-1F-A4-8F | RM86ADSL |
| 00-18-84-88-CE-37 | FON_FREE_INTERNET |
| 00-18-84-88-CE-36 | Convergence |
| 00-11-20-EF-CD-40 | Vocera |
| 00-11-20-EF-CD-41 | Healthnet |
| 00-11-20-EF-CD-42 | PanG0pgtp |
| 00-11-20-EF-CD-44 | APCC |
| 00-11-5C-D1-57-61 | BTOpenzone |
| 00-11-5C-D1-57-62 | w1Re3.5E2viCe |
| 00-11-5C-D1-57-60 | AR0adrunner |
| 00-1D-7E-B3-92-AA | BAT-Mesh |
| 00-30-1A-0F-5B-81 | PICTure |
| 00-23-33-C3-4E-30 | PICTure |

The Home fingerprint is loaded in step s25 and the results of steps s27 and s29 are shown in Table 13.

TABLE 13

| MAC Address | Name | Cumulative score |
| --- | --- | --- |
| L1nksys123 | 0 | 0 for 0 of 1 |
| RM86ADSL | 0 | 0 for 0 of 2 |
| FON_FREE_INTERNET | 0 | 0 for 0 of 3 |
| Convergence | 0 | 0 for 0 of 4 |
| Vocera | 0 | 0 for 0 of 5 |
| Healthnet | 0 | 0 for 0 of 6 |
| PanG0pgtp | 0 | 0 for 0 of 7 |
| APCC | 0 | 0 for 0 of 8 |
| BTOpenzone | 0 | 0 for 0 of 9 |
| w1Re3.5E2viCe | 0 | 0 for 0 of 10 |
| AR0adrunner | 0 | 0 for 0 of 11 |
| BAT-Mesh | 0 | 0 for 0 of 12 |
| PICTure | 0 | 0 for 0 of 13 |
| PICTure | 0 | 0 for 0 of 14 |

Cumulative match score is 0.

At step s31 it is determined that there is another registered fingerprint and therefore the Office fingerprint is loaded in step s25 and the results of steps s27 and s29 are shown in Table 13.

TABLE 14

| Name | Mean (dBm) | SigStrength - Mean | Score | Cumulative |
| --- | --- | --- | --- | --- |
| L1nksys123 | −55 | 4 | 93 | 93 for 1 of 1 |
| RM86ADSL | −51 | 0 | 100 | 193 for 2 of 2 |
| FON_FREE_INTERNET | −54 | −2 | 97 | 290 for 3 of 3 |

TABLE 14-continued

| Name | Mean (dBm) | SigStrength - Mean | Score | Cumulative |
|---|---|---|---|---|
| Convergence | −55 | −3 | 95 | 385 for 4 of 4 |
| Vocera | −59 | 1 | 99 | 484 for 5 of 5 |
| Healthnet | −60 | 2 | 97 | 581 for 6 of 6 |
| PanG0pgtp | −59 | 1 | 99 | 680 for 7 of 7 |
| APCC | −59 | 0 | 100 | 780 for 8 of 8 |
| BTOpenzone | −73 | 7 | 91 | 871 for 9 of 9 |
| w1Re3.5E2viCe | −73 | 7 | 91 | 962 for 10 of 10 |
| AR0adrunner | −73 | 5 | 94 | 1056 for 11 of 11 |
| BAT-Mesh | −88 | 3 | 97 | 1153 for 12 of 12 |
| PICTure | −89 | 3 | 97 | 1250 for 13 of 13 |
| PICTure | −95 | −1 | 99 | 1349 for 14 of 14 |

Cumulative match score is 96

In this example, the office fingerprint is a much closer match. Therefore the Office name is output to the controller in step s33. In this case, two events are generated.

As described earlier, the recognition by the device of leaving home and entering the office environment will result in context dependent changes to the operation of the mobile device. For example, switching the profile of the phone, setting voicemail or call redirections etc.

Furthermore, the mobile device may be configured to display the location to the user or furthermore to transmit the location information to a remote service known as a Presence server.

Grouping Locations in a Fingerprint

As described earlier, the cumulative matching score function in equation 4 is arranged to ignore wireless access points which are in the fingerprint but are not observed in a subsequent scan. This allows for an improvement in the storage of the fingerprints. In particular, it is possible for locations which are not geographically close together to be grouped and stored as a single fingerprint since there is no negative effect in subsequent location determination.

Returning to FIG. 1, the second office location 7 is situated a few kilometers away from the first office location 5. The set 15 of wireless access points 13a-13o surround the first office 5 but are not observed at the second office location 7. Similarly, the set 19 of wireless access points 17a-17c surround the second office location 7 but are not observed at the first office location. However, since they are both workplaces, the user would like the mobile device to behave in the same way. The conventional method requires sets 15 and sets 19 to be stored as separate fingerprints but the particular characteristics of the matching method allows for a single "office" fingerprint covering both locations.

In this case, the user issues a command to create a fingerprint as before. The processing carried out by the fingerprint processor is essentially the same as described for the first office location with reference to steps s1 to s13 in FIG. 4. Table 15 shows the results of the initial scan.

TABLE 15

| MAC Address | Name |
|---|---|
| 00-3E-13-F2-B3-A9 | BTFON |
| 00-3E-16-F2-03-0D | DRIFTER |
| 00-3E-16-F2-03-09 | NICEDAY |

At step s15 the user is prompted for a name. If the user enters "Office", the fingerprint processor recognises that there is already an existing fingerprint with the same name and informs the controller 37 which notifies the user and asks whether they would like to merge the new scan data into the existing office fingerprint. In this case, the user wishes both locations to be treated in a similar manner and therefore the fingerprints are merged.

After the further processing steps to fully record the wireless access points, the data shown in Table 16 is stored in the Office fingerprint.

TABLE 15

| Name | Partial sum of observed Signal Strength (dBm) | Observations |
|---|---|---|
| BTFON | −195 | 4 |
| MOBILE | −220 | 4 |
| WIFI | −225 | 4 |

Summary

The operation of the fingerprint controller 47 in the mobile device 21 allows a user to register certain locations of contextual importance and set specific behaviours in response to a determination that they are located at a particular location. To achieve this, the mobile device is configured to store a fingerprint profile of the surrounding wireless access points. During a matching process, the set of observed wireless access points is compared against the set of wireless access points stored in each of the fingerprints. The scoring function used is to determine the degree of correspondence between the observed set and each fingerprint generates a matching score and the behaviour associated with the closest matching fingerprint is activated. The scoring function is arranged so that access points which are present in a given fingerprint but not present in the observed set are ignored so that they do not influence the scoring. This improves the robustness of the matching function by acknowledging that wireless access points are not permanent and may move or be removed.

A further benefit of the matching function is that the fingerprints can contain wireless access point data relating to a plurality of geographical locations and these locations do not need to be near each other as they are simple ignored by the matching function. This allows for a smaller number of fingerprints which, even though they are larger than conventional fingerprints, is more manageable.

Alternatives and Modifications

The described embodiments relied on WiFi signals generated by wireless access points in order to create the fingerprint profiles. In an alternative, the Bluetooth or WiMax protocols may be used as additional fingerprint entries.

In the embodiments, fingerprints are generated only in response to an explicit request from the user that a new location is to be recorded. This ensures that only contextually relevant places are stored. In an alternative, the mobile device is configured to periodically scan for surrounding wireless access points and try to determine its position. When there is a match then the phone's configuration could be automatically updated. Similarly, if the user visits and remains at an unrecorded location for a predetermined period of time, or visits an unrecorded location frequently, the fingerprint processor temporarily stores information to generate a basic fingerprint and offers the user the choice of creating a new fingerprint. If the user wishes to store the location then they simply need to provide a context name. Such a setup would require more storage space as potentially a large number of potential fingerprints would be generated and stored.

In a further alternative, instead of performing the registration process as soon as a user request is received, the wireless access point scanner is arranged to log the scan information and the fingerprint registration process is performed "offline" such as during an idle period.

In the embodiment, the scoring calculation in equation 3 is based on a function in which the score is a triangle with its apex value at the mean signal strength and lower values as the signal strength moves towards an infinitely strong signal of 0 dbm and also as the signal strength moves towards 2*mean. In an alternative, different ranges are set such as decay away from a preset number of standard deviations or other weightings away from the mean.

In the embodiment, the scoring equation is based on the signal strength variation from the mean score. In an alternative, the number of observations field in the fingerprint is used as in an indication of the reliability of the wireless access point and a weighting is applied to each calculated score in dependence on the deemed reliability of the wireless access point.

In the embodiment, the fingerprint stores a MAC address, an SSID, a partial sum of signal strength and the number of observations. It will be appreciated that further information could be stored such as the creation time of the fingerprint, the last time it was observed and also a decay factor. These extra fields are useful for management of fingerprints. For example, wireless access points which are not observed for a long time are assumed to have been removed. Although the matching process described above is tolerant to the absence of wireless access points, access points which are no longer present can be removed from the fingerprint to save storage space. Similarly if the wireless access points in an entire fingerprint have not been observed for a long time, then the entire fingerprint can be removed or a message can be presented to the user to request removal of the entire fingerprint if it is no longer relevant to them.

In the embodiment, the statistics for each wireless fingerprint are only changed during the registration process. In a modification, when a scan is performed at a registered location and the match scoring is particularly high, the fingerprint processor is arranged to ask the user to confirm they are at a particular contextual location. If the user confirms, then the scores of the observed set leading to the match are used to update the stored fingerprint data. In an alternative, the device is set to automatically update the scores when the matching result is above a threshold score.

In the embodiment, the wireless signal strengths of wireless access points are compared. Of course, in more sparse areas, the mere presence of a wireless access point at a certain location is sufficient to determine a location and user context. Therefore the match is performed on the basis of a network address (MAC address) or SSID.

The invention claimed is:

1. A method of determining the location of a mobile apparatus, the mobile apparatus having a wireless network interface and a data store the method comprising:
   searching for wireless access point devices and storing any located wireless access points as a located set of wireless access point devices, in the data store;
   accessing at least one profile stored in the data store, the at least one profile relating to a pre-registered user context and containing data corresponding to a plurality of wireless access point devices associated with said pre-registered user context;
   matching the profile, or matching each profile, against the located set of wireless access point devices located in the searching step; and
   outputting the pre-registered user context if the degree of correspondence between the located set of wireless access point devices and the at least one profile is above a threshold,
   wherein
   the at least one profile contains at least two different groups of wireless access points, each group being located in a different geographical location and associated with the same user context; and
   any wireless access point devices which are present in the at least one profile but not present in the located set of wireless access point devices are ignored during the matching step.

2. A method according to claim 1, further comprising:
   changing the configuration of the mobile apparatus in response to the output pre-registered user context.

3. A method according to claim 1, wherein the data corresponding to each wireless access point device in the plurality of wireless access point devices is a unique identifier and an observed signal strength, the matching step comprising:
   sampling the signal strength of received wireless signals emitted by each located wireless access point device;
   performing a process for each located wireless access point device in the located set of located wireless access point devices, by:
      checking whether the identity of that wireless access point device is present within the at least one profile;
      if the located wireless access point device is present in the at least one profile:
         scoring the sampled signal strength against a respective observed signal strength in the at least one profile for that wireless access point device; and
         accumulating the scores for the wireless access point device with previously processed wireless access point devices; and
   generating a value indicative of the amount of correspondence between the located set of located wireless access point devices and the wireless access point devices in the at least one profile.

4. A method according to claim 1, wherein there are at least two profiles and the associated output user context is determined and output based on the closest matching profile.

5. A non-transitory computer readable storage medium containing instructions for causing a programmable processor for performing the method of claim 1.

6. A mobile apparatus for determining a location comprising:
   a data store storing at least one profile relating to a pre-registered user context and containing data corresponding to a plurality of wireless access point devices associated with said pre-registered user context;
a network interface configured to search for wireless access point devices and store any located wireless access points as a located set in the data store;
a data processor configured to:
  match the profile, or match each profile, against a set formed of any located wireless access point devices; and
  output the pre-registered user context if the degree of correspondence between the located set of located wireless access point devices and the at least one profile is above a threshold,
wherein
  the at least one profile contains at least two different groups of wireless access points, each group being located in a different geographical location and associated with the same user context,
  any wireless access point devices which are present in the at least one profile but not present in the located set of located wireless access point devices are ignored by the data processor to match the or each profile against located set of wireless access points.

7. Apparatus according to claim 6, wherein:
the configuration of the mobile apparatus is changed in response to the output pre-registered user context.

8. Apparatus according to claim 6, wherein the data corresponding to each wireless access point device in the plurality of wireless access point devices is a unique identifier and an observed signal strength, the processor is further configured to:
  sample the signal strength of received wireless signals emitted by each located wireless access point device;
  perform a process for each located wireless access point device in the located set, by:
    checking whether the identity of that wireless access point device is present within the at least one profile;
    if the located wireless access point device is present in the at least one profile:
      scoring the sampled signal strength against the respective stored signal strength in the at least one profile for that wireless access point device; and
      accumulating the scores for the wireless access point device with previously processed wireless access point devices; and
  generate a value indicative of the amount of correspondence between the located set of wireless access point devices and the wireless access point devices in the at least one profile.

9. Apparatus according to claim 6 wherein the data store contains at least two profiles and the associated output user context is determined and output based on the closest matching profile.

* * * * *